United States Patent
Shani et al.

(10) Patent No.: US 10,528,456 B2
(45) Date of Patent: Jan. 7, 2020

(54) DETERMINING IDLE TESTING PERIODS

(71) Applicant: ENTIT Software LLC, Sunnyvale, CA (US)

(72) Inventors: Inbar Shani, Yehud (IL); Amichai Nitsan, Yehud (IL); Yaron Burg, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 15/568,099

(22) PCT Filed: May 4, 2015

(86) PCT No.: PCT/US2015/029007
§ 371 (c)(1),
(2) Date: Oct. 20, 2017

(87) PCT Pub. No.: WO2016/178661
PCT Pub. Date: Nov. 10, 2016

(65) Prior Publication Data
US 2018/0143897 A1 May 24, 2018

(51) Int. Cl.
*G06F 11/36* (2006.01)
*G06F 11/30* (2006.01)

(52) U.S. Cl.
CPC ........ *G06F 11/3688* (2013.01); *G06F 11/302* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 7,253,606 B2 | 8/2007 | Loh et al. | |
| 8,265,906 B2 | 9/2012 | Bondi et al. | |
| 8,627,317 B2 | 1/2014 | Altman et al. | |
| 2003/0220984 A1* | 11/2003 | Jones | H04L 29/06 709/219 |

(Continued)

OTHER PUBLICATIONS

Sundarrajan, Suraj, Using Web Analytics for Modeling Application Usage in Performance Tests, Dec. 12, 2011, 5 pages http://speeduptheweb.com, https://loadstorm.com/2011/12/using-web-analytics-modeling-application-usage-performance-tests/.

(Continued)

*Primary Examiner* — Daxin Wu

(57) ABSTRACT

Example implementations relate to determining idle testing periods. Some implementations may include a data capture engine to capture data points during test executions of the application under test. The data points may include, for example, test action data and application action data. Additionally, some implementations may include a data correlation engine to correlate each of the data points with a particular test execution of the test executions, and each of the data points may be correlated based on a sequence of events that occurred during the particular test execution. Furthermore, some implementations may also include an idle testing period determination engine to determine, based on the correlation of the data points, idle testing periods of the test executions. The idle testing periods may be periods of time where both the test executions and the application under test are idle.

20 Claims, 7 Drawing Sheets

(56) References Cited

U.S. PATENT DOCUMENTS

| | | |
|---|---|---|
| 2005/0204201 A1* | 9/2005 | Meenakshisundaram .................... G06F 11/3664 714/38.1 |
| 2006/0020448 A1 | 1/2006 | Sathe et al. |
| 2006/0041864 A1 | 2/2006 | Holloway et al. |
| 2007/0168744 A1* | 7/2007 | Pal ...................... G06F 11/3688 714/38.1 |
| 2011/0202901 A1 | 8/2011 | Givoni et al. |
| 2011/0252356 A1* | 10/2011 | Morris .................... G06F 9/451 715/772 |
| 2011/0296371 A1 | 12/2011 | Marella |
| 2012/0192153 A1 | 7/2012 | Venkatraman et al. |
| 2014/0282425 A1 | 9/2014 | Zhao et al. |
| 2015/0301071 A1* | 10/2015 | Dhan ................. G01N 35/0092 702/108 |
| 2017/0293551 A1* | 10/2017 | Shani ................. G06F 11/3688 |

OTHER PUBLICATIONS

International Search Report and Written Opinion for PCT Application No. PCT/US2015/029007, filed May 4, 2015, dated Feb. 25, 2016, 11 pages.

* cited by examiner

DETERMINING IDLE TESTING PERIODS

BACKGROUND

Application testing may be performed to provide information about an application under test ("AUT"). For example, application testing may be performed to determine whether the AUT includes any errors or other defects. During testing, there may be idle testing periods where both the test and the AUT are idle.

BRIEF DESCRIPTION OF THE DRAWINGS

The following detailed description references the drawings, wherein.

DETAILED DESCRIPTION

Figure 1:
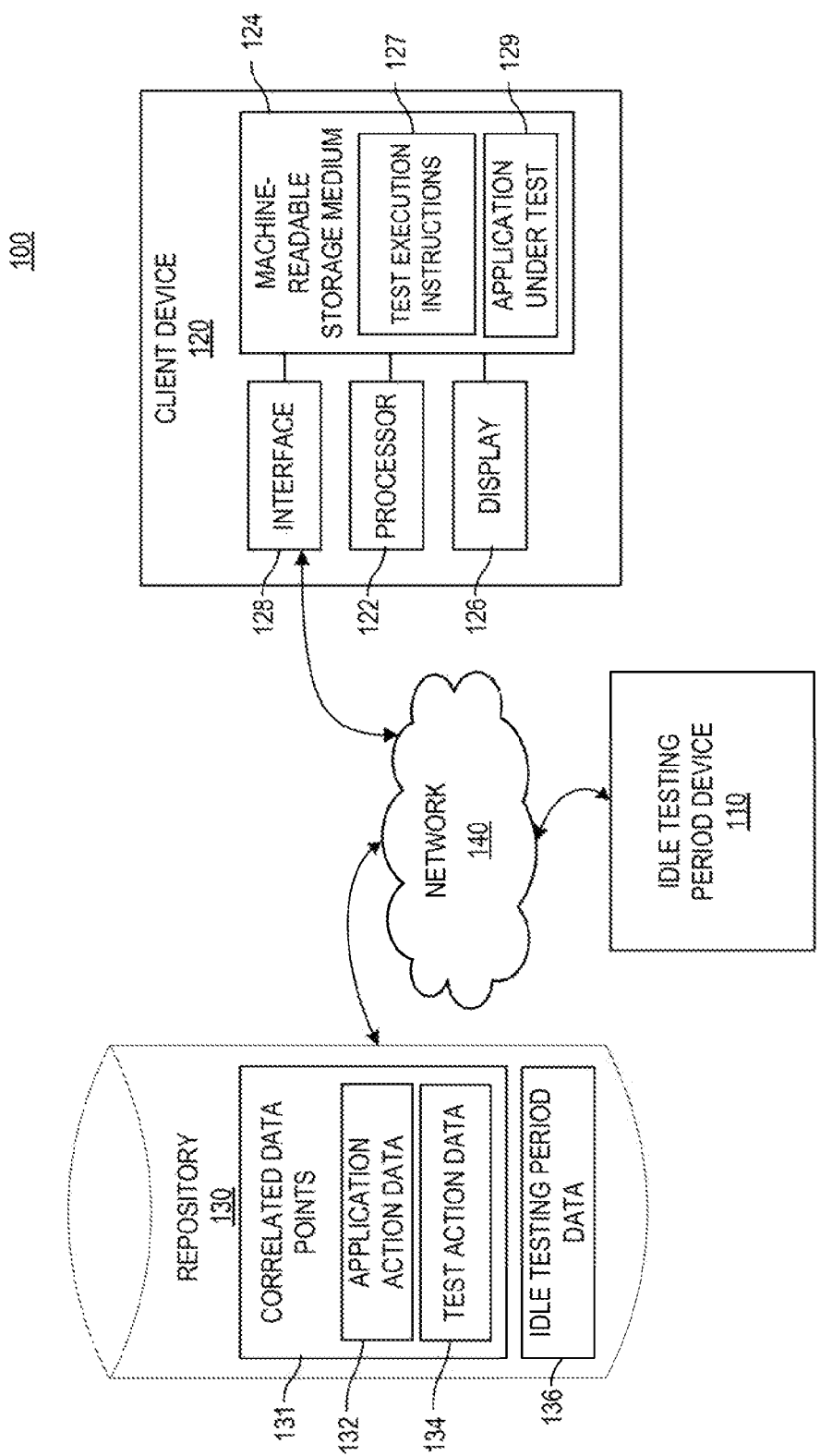
FIG. 1 is a block diagram of an example system for determining idle testing periods consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

An idle testing period may be a period of time during testing where both a test execution and an AUT are idle. For example, there may be periods of time during a test execution where a tester or an automated test script is not interacting with an application even though the application is available for performing a test action (e.g., an interaction with the AUT). These idle testing periods are not only a waste of test execution time, but are difficult to identify. For example, consider the case where an AUT is a travel application and the test case is determining whether the application retrieves a flight that meets certain requirements. After the tester inputs and submits those requirements, there is a time period where the tester is waiting for the application to search various databases and return the appropriate results. By simply looking at the tester's interaction with the application during this time period, it may appear that the tester is idle when in fact the tester is simply waiting for the AUT to process. As another example, during automated testing there are built-in timeouts to account for AUT processing, but these are defined by trial and error and may overcompensate or undercompensate for test execution. Accordingly, a proper determination of idle testing periods must account for both the actions of the test and the AUT.

Examples disclosed herein may determine idle testing periods by accounting for both the actions of the test and the AUT. To this end, some examples may capture data points from test executions of an AUT and, based on the captured data points, may determine idle testing periods of the test executions. For example, examples consistent with disclosed implementations may capture data points during test executions of an AUT (e.g., data points that include application action data and test action data), correlate each of the data points with a particular test execution of the AUT, and determine, based on the correlation of the data points, idle testing periods of the test executions. The idle testing periods may be periods of time where both the test executions and the AUT are idle.

Referring now to the drawings, FIG. 1 is a block diagram of an example system 100 for determining idle testing periods. System 100 may be implemented in a number of different configurations without departing from the scope of the disclosed examples. In the example shown in FIG. 1, system 100 may include an idle testing period device 110, a client device 120, a repository 130, and a network 140 for connecting idle testing period device 110 with client device 120 and/or repository 130.

Idle testing period device 110 may be a computing system that performs various functions consistent with disclosed examples. For example, idle testing period device 110 may be a server, a desktop computer, a laptop computer, and/or any other suitable type of computing device. In some examples, idle testing period device 110 may process information received from client device 120 and/or repository 130. For example, idle testing period device 110 may determine idle testing periods of test executions based on data captured from client device 120 and/or received from repository 130. Examples of idle testing period device 110 and certain functions that may be performed by device 110 are described in greater detail below with respect to, for example, FIGS. 2-9.

Client device 120 may be a computing system operated by a user. For example, client device 120 may be a desktop computer, a laptop computer, a tablet computing device, a mobile phone, and/or any other suitable type of computing device. In some examples, client device 120 may be a computing device to perform operations consistent with certain disclosed implementations. For example, client device 120 may be adapted to transmit data related to test executions of an AUT to idle testing period device 110, such as, for example, data related to action steps performed during application testing.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as test execution application instructions 127 and/or AUT instructions 129) to test an AUT. While in the example shown in FIG. 1 the AUT resides on client device 120, test execution instructions 127 and/or the AUT 129 may reside on different machines and/or may span multiple computing systems. Machine-readable storage medium 124 may be any electronic, magnetic, optical, or other non-transitory storage device that stores instructions executed by processor 122. Display 126 may be any type of display device that presents information, such as a user interface of an AUT, to a user (e.g., a tester) operating client device 120. Interface 128 may be any combination of hardware and/or programming that facilitates the exchange of data between the internal components of client device 120 and external components, such as idle testing period device 110. In some examples, interface 128 may include a network interface device that allows client device 120 to receive and send data to and from various components, such as to and from idle testing period device 110 via network 140.

Repository 130 may be any type of storage system configuration that facilitates the storage of data. For example, repository 130 may facilitate the locating, accessing, and retrieving of data points captured during test executions of an AUT (e.g., SaaS, SQL, Access, etc. databases). Repository 130 can be populated by a number of methods. For example, idle testing period device 110 may populate repository 130 by receiving, generating, and/or otherwise accessing idle testing period data (e.g., data related to the idle testing periods, such as test number, idle testing period test locations, idle testing period length, etc.) and/or storing the idle testing period data in repository 130. As another example, idle testing period device 110 may populate repository 130 with data points captured and correlated by idle testing period device 110, and store the correlated data points in repository 130. In some implementations, the data points may be stored as a directed acyclic graph ("DAG"). Traditionally, a DAG is a directed graph formed by a collection of vertices (e.g., a fundamental unit of which the graph is formed) and directed edges (e.g., an edge that points from a first vertex in the collection of vertices to a second vertex in the collection of vertices). A DAG, as used herein, doesn't necessarily mean a graphic representation of the data included in a traditional DAG. Instead, a DAG as used herein may include the graphic representation and/or a data structure that stores the data points in a manner that allows system 100 to determine data represented by the traditional DAG (e.g., categorization of the data points, directed edges associated with particular data points, and/or vertices associated with the data points). In some examples, the data structure may be an array, a record, a database entry, a lookup table, a hash table, a map, a tree, a linked list, and/or any other type of data structure. An example of a DAG consistent with disclosed implementations is discussed in more detail below with respect to, for example, FIG. 5.

While in the example shown in FIG. 1 repository 130 is a single component external to components 110 and 120, repository 130 may comprise separate components and/or may be part of devices 110, 120, and/or another device. In some implementations, repository 130 may be managed by components of device 110 and/or other devices that are capable of accessing, creating, controlling and/or otherwise managing data remotely through network 140.

Network 140 may be any type of network that facilitates communication between remote components, such as idle testing period device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1 shows one idle testing period device 110, client device 120, repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1).

Figure 2:
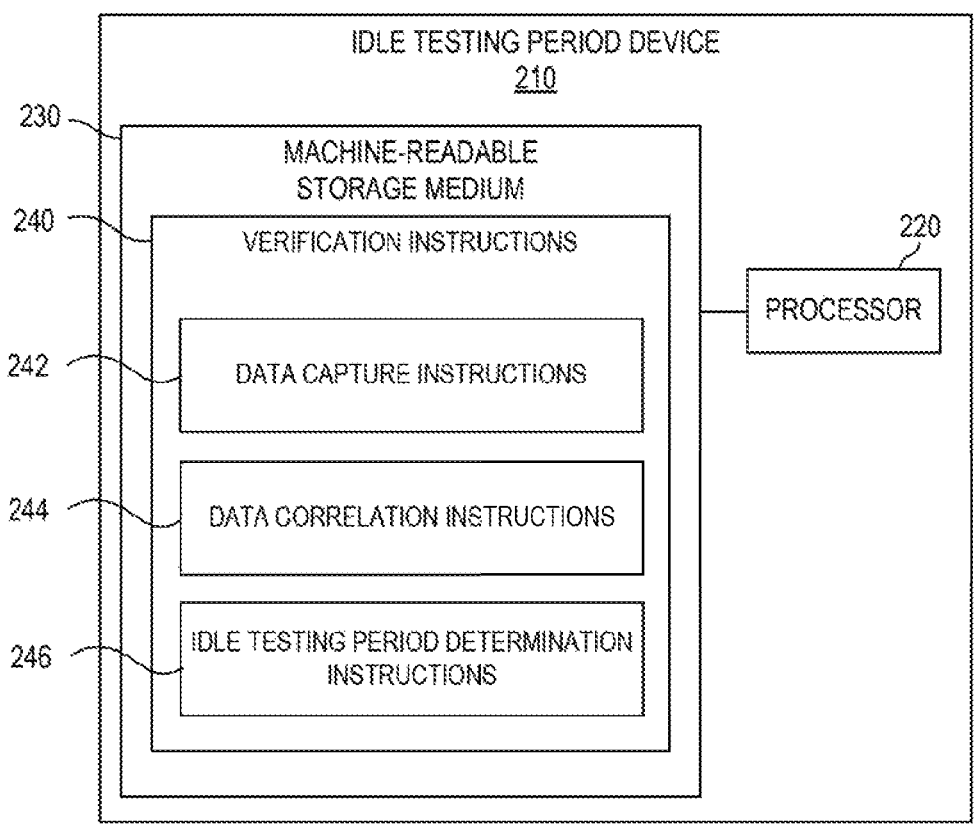
FIG. 2 is a block diagram of an example idle testing period device consistent with disclosed implementations.

FIG. 2 is a block diagram of an example idle testing period device 210 consistent with disclosed implementations. In certain aspects, idle testing period device 210 may correspond to idle testing period device 110 of FIG. 1. Idle testing period device 210 may be implemented in various ways. For example, device 210 may be a special purpose computer, a server, a mainframe computer, and/or any other suitable type of computing device. In the example shown in FIG. 2, idle testing period device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute identification instructions 240 (e.g., instructions 242, 244, and/or 246) stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium, where the term "non-transitory" does not encompass transitory propagating signals. Machine-readable storage medium 230 may be encoded with instructions that, when executed by processor 230, perform operations consistent with disclosed implementations. For example, machine-readable storage medium 240 may include instructions that perform operations to determine idle testing periods by capturing data points during test executions of an AUT, correlating each of the data points with a particular test execution of the AUT, and determining idle testing periods of the test executions based on the correlation of the data points. In the example shown in FIG. 2, machine-readable storage medium 230 may include data capture instructions 242, data correlation instructions 244, and idle testing period determination instructions 246.

Data capture instructions 242 may function to capture data points during test executions of an AUT. In some implementations, when data capture instructions 242 are executed by processor 220, data capture instructions 242 may cause processor 220 and/or another processor to capture data points during test executions of the AUT. For example, data capture instructions 242 may cause processor 220 and/or another processor to access, receive, or otherwise obtain the data points from one or more computing systems that execute the test and/or implement the AUT during the test executions. In some examples, the data points may be captured by installing agents on various physical or virtual system components to monitor how the particular component(s) function and to transmit the data points to a storage device, such as a storage device associated with idle testing period device 110. The transmitted data points may then be received and/or captured by idle testing period device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component(s) memory usage.

In some implementations, the captured data points may include application action data that includes data related to actions performed by the application under test in response to test actions performed during the test executions, the application action data including data related to various levels of the AUT, such as a user interface level (e.g., UI snapshots, UI object extractions, etc.), a code level (e.g., code executed behind the UI), a network communication level (e.g., network communications between client device 120 and idle testing period device 110), a database level (e.g., databases accessed by the AUT during test execution), and an environment level (e.g., data related to the environment of the AUT such as data related to hardware (e.g., device build, CPU usage, memory usage, resource usage, etc.) and programming (e.g., operating system, browser, etc.) that are related to the execution of the test of the AUT (e.g., server logs) and/or that relate to the execution of the AUT itself (e.g., application server errors)). In some examples, the captured data points may include test action data that includes data related to the test actions performed during the test executions, such as test actions and/or steps performed during the particular test execution state (e.g., start test step (e.g., data indicating that the data point is related to the start of a test step), end test step (e.g., data indicating that the data point is related to the end of a test step), report test result step (e.g., data indicating that the data point is related to a particular result of a test step), complete test step (e.g., data indicating that the data point is related to the completion of an entire test), and/or a report test step (e.g., data indicating that the data point relates to reporting the results on the entire test)), and/or metadata related to the AUT (e.g., AUT version), the particular test execution state (e.g., test date/time, tester name, etc.), and the like. Examples of capturing data points during test executions of an AUT are described in further detail below with respect to, for example, FIGS. 2-8.

Data correlation instructions 244 may function to correlate data points. For example, when data correlation instructions 244 are executed by processor 220, data correlation instructions 244 may cause processor 220 to correlate each of the data points with a particular test execution of the AUT. In some implementations, the data points may be correlated based on a sequence of events that occurred during the particular test execution. For example, data correlation instructions 244 may cause processor 220 to generate a DAG and/or store the data in a manner that allows contextual queries of the data. In some examples, the DAG and/or the correlated data may be stored in a repository, such as repository 130. Examples of correlating data points are described in further detail below with respect to, for example, FIGS. 4 and 5.

Idle testing period determination instructions 246 may function to determine, based on the correlation of the data points, idle testing periods of the test executions. In some implementations, the idle testing periods may be periods of time where both the test executions and the application under test are idle. For example, when idle testing period determination instructions 246 are executed by processor 220, idle testing period determination instructions 246 may cause processor 220 to determine idle testing periods by identifying suspected inaction periods during the test executions. These suspected inaction periods may be identified by determining whether the correlated data includes an absence of at least one particular type of application action data and at least one particular type of test action data. For example, at a particular point in time a particular type of application action data (e.g., user interface level data) may be missing at the same time that a particular type of test action data (e.g., a start test step that follows a complete test step) may also be missing. Examples of determining idle testing periods are described in further detail below with respect to, for example, FIG. 6.

Figure 3:
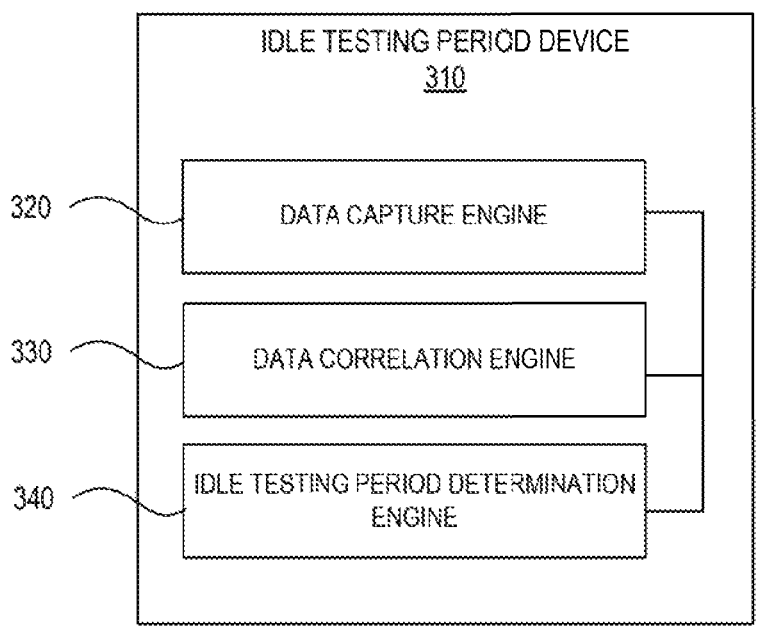
FIG. 3 is a block diagram of an example idle testing period device consistent with disclosed implementations.

FIG. 3 is a block diagram of an example idle testing period device 310 consistent with disclosed implementations. In certain aspects, idle testing period device 310 may correspond to idle testing period device 110 of FIG. 1 and/or idle testing period device 210 of FIG. 2. Device 310 may be implemented in various ways. For example, device 310 may be a special purpose computer, a server, a mainframe computer, and/or any other suitable type of computing system. In the example shown in FIG. 3, device 310 may include a data capture engine 320, a data correlation engine 330, and an idle testing period determination engine 340.

Engines 320, 330, and 340 may be electronic circuitry for implementing functionality consistent with disclosed examples. For example, engines 320, 330, and 340 may represent combinations of hardware devices and programming to implement the functionality consistent with disclosed implementations. In some examples, the functionality of engines 320, 330, and/or 340 may correspond to operations performed by idle testing period device 210 of FIG. 2, such as operations performed when identification instructions 240 are executed by processor 220 (described above with respect to FIG. 2). In FIG. 3, data capture engine 320 may represent a combination of hardware and programming that performs operations similar to those performed when processor 220 executes data capture instructions 242. Similarly, data correlation engine 330 may represent a combination of hardware and programming that performs operations similar to those performed when processor 220 executes data correlation instructions 244, and idle testing period determination engine 340 may represent a combination of hardware and programming that performs operations similar to those performed when processor 220 executes idle testing period determination instructions 246.

Figure 4:
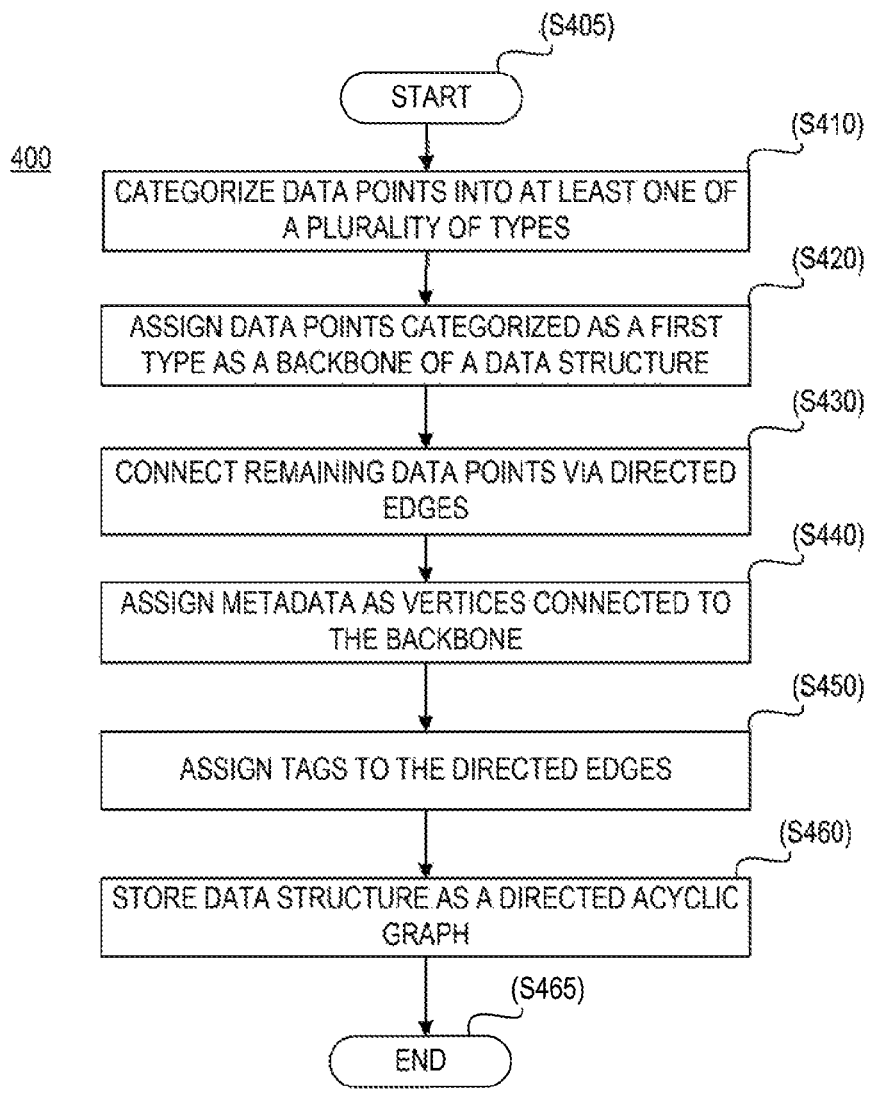
FIG. 4 is a flow chart of an example process for correlating data points consistent with disclosed implementations.

FIG. 4 is a flow chart of an example process 400 for correlating data points consistent with disclosed implementations. Although execution of process 400 is described below with reference to system 100 of FIG. 1 and/or specific components of system 100, other suitable systems and devices for execution of at least one step of process 400 may be used. For example, processes described below as being performed by idle testing period device 110 may be performed by idle testing period device 210, idle testing period device 310, idle testing period device 710, and/or any other suitable device. Process 400 may be implemented in the form of executable instructions stored on a machine-readable storage medium and/or in the form of electronic circuitry.

Process 400 may start (step S405) after data points have been captured during test executions of an AUT. Once the data points have been captured, process 400 may function to correlate each of the data points by generating a DAG. In some implementations, the DAG may be generated based on timestamps associated with the data points. For example, process 400 may include categorizing the data points into at least one of a plurality of types (step S410). For example, the data points may be categorized based on steps of the test execution, data type (e.g., CPU, memory, UI object, user action, network packet, etc.), a particular user (e.g., an identify of the user who was running the test), AUT build (the specific build version of the AUT when the data points were captured), and/or any other suitable categorization. In some implementations, the plurality of types may include a first type. For example, the first type may be test actions of the test execution such as, for example, steps involved in tester interaction with a user interface of the AUT. As another example, the first type may be application actions of the test execution such as, for example, actions of the AUT that are performed in response to the test actions. The definition of the particular types may be predetermined, or may be based on input from a user. For example, a user may define the application action type as all actions completed by the AUT between a test action and a full update to a user interface (e.g., may transmit the user interface has been updated such that all of the text and/or graphics have fully loaded) of the AUT. Thus, in some implementations, application actions performed in response to a test action may not include background processes that are being performed that do not affect the testing of the AUT and/or each of the idle testing periods may be an amount of time that elapses between a full update to a user interface of the AUT and a subsequent test action that immediately follows the full update. Process 400 may also include assigning data points categorized as the first type as a backbone of a data structure. For example, system 100 may assign data points associated with test steps of the test execution as a backbone of the data structure (step S420).

Process 400 may also include connecting remaining data points (e.g., a set of the data points that are not categorized as the first type) via directed edges based on timestamps associated with the remaining data points (step S430). For example, the data points may be connected via directed edges from a first data point of the first type (e.g., a first test step of the test steps). In some examples, the data points may be connected based on a length of time between a time stamp associated with a particular data point of the captured data points, and a time stamp associated with the first test step. For example, system 100 may order the test steps in the backbone sequentially based on when the test steps were executed. Events associated with a particular test step may be traced and associated with the particular test step. For example, system 100 may trace UI objects. A UI scanner may run periodically and automatically identify structured objects in the UI, their attributes, and their values. As another example, system 100 may trace system events associated with a particular test steps by implementing a thread event monitor that monitors threads for a creation of an object, the run of an object, the termination of an object, and the like, and associate the creation, run, and/or termination of objects to a particular test event based on thread and object identifiers.

Process 400 may also include assigning the metadata as vertices connected to the backbone (step S440). For example, system 100 may determine the elements of the backbone and may assign metadata traced to each particular element (e.g., each test step). For example, system 100 may trace the metadata based on time-relations (e.g., the event happened after a particular test step) or based on another suitable methodology (e.g., coloring network packets to trace them to a server code). Additionally process 400 may also include assigning tags to the directed edges to identify a type of relation between the vertices (step S450). In some implementations, system 100 may assign tags to the directed edges based on data received from the agents installed on the various physical or virtual system components. For example, the agents may include instructions, that when executed by a processor, compare an event occurring with the system to a list of rules. If the event matches a particular rule, the agent notes the tag association between events. For example, assume that the list of rules includes a use tagging rule that requires tagging a directed edge as "use" when a test step involves the usage of a browser. When a test step is executed that invokes an object named "browser," the agent may compare the invocation of the object to the list of rules and, based on the use tagging rule in the list, tag the directed edge as "use."

Process 400 may also include storing the data structure (step S460) in a storage device. In some implementations, the data structured may be stored in a storage device such as a non-transitory computer-readable storage medium, such as a machine-readable storage medium in idle testing period device 110, repository 130, and/or in another device. After the data points have been categorized (step S410), the backbone of the data structure has been assigned (step S420), the remaining data points are connected (step S430), the metadata has been assigned as vertices (step S440), the tags have been assigned to the directed edges (step S450), and/or the data structure has been stored (step S460), process 400 may end (step S475).

Figure 5:
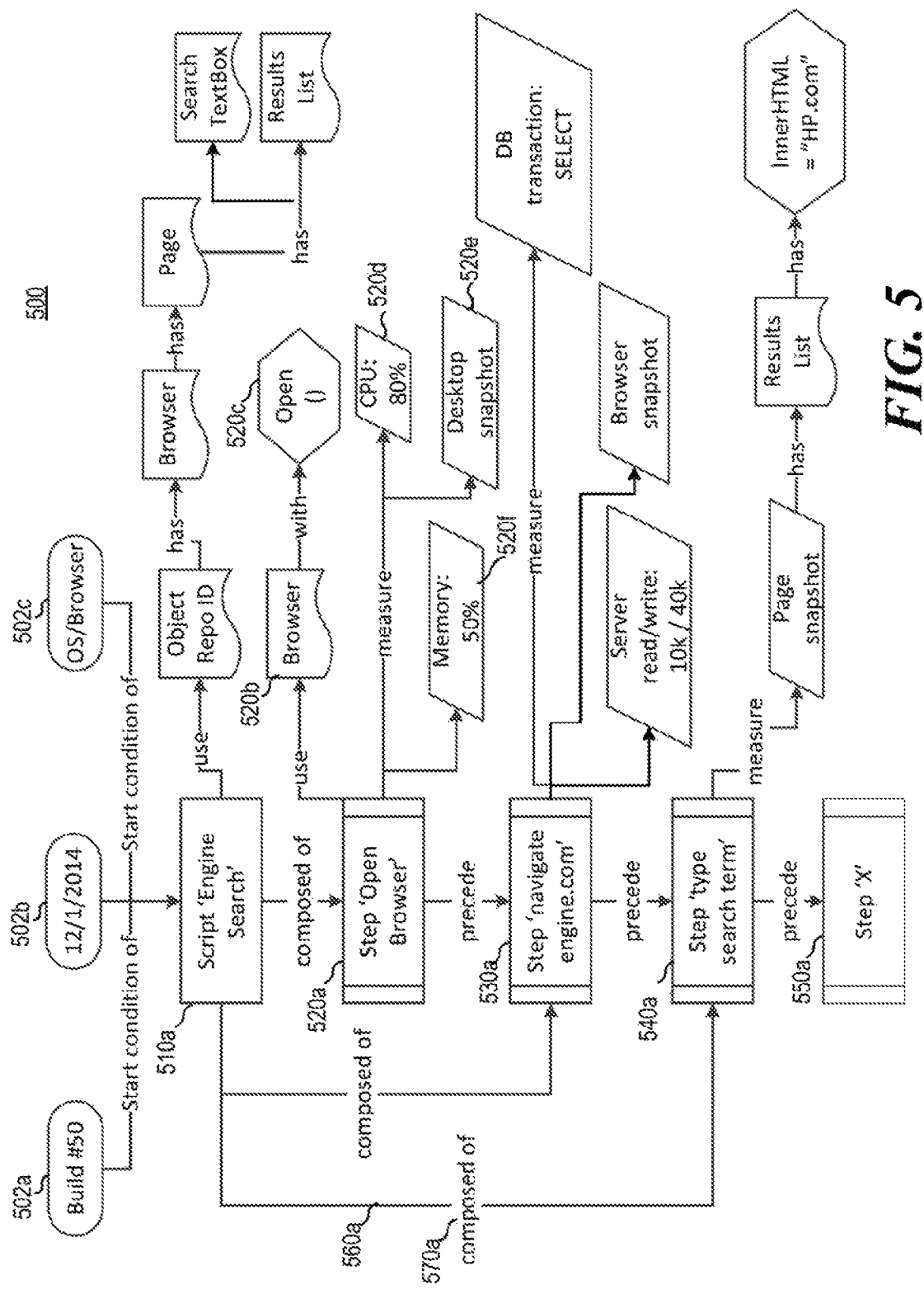
FIG. 5 is a block diagram of an example DAG consistent with disclosed implementations.

FIG. 5 is an example of a block diagram of a DAG 500 consistent with disclosed implementations. For example, DAG 500 may represent data points captured during test executions of an AUT that have been correlated based on a sequence of events that occurred during a particular test execution. Although the example DAG 500 is described below as being managed by, updated by, and/or otherwise utilized by system 100 of FIG. 1 and/or specific components of system 100, other suitable systems and devices for managing, updating, and/or otherwise utilizing DAG 500 may be used. For example, processes described below as being performed by idle testing period device 110 may be performed by idle testing period device 210, idle testing period device 310, and/or any other suitable device. Processes performed with respect to DAG 500 may be implemented in the form of executable instructions stored on a machine-readable storage medium and/or by electronic circuitry As shown in FIG. 5, DAG 500 may include data related to one or more particular test executions of an AUT. In the example shown in FIG. 5, the data includes data points related to application data 502a (e.g., build number), test data (e.g., the date of the test) 502b, and environment data 502c (e.g., operating system and browser type). DAG 500 also includes a backbone (the collective of test steps 510a, 520a, 530a, 540a, and 550a) which serves as the anchor for each of the vertices in the DAG. In some implementations, each data point may be considered to be a node within the DAG and may be classified based on the categorization of the particular data points (e.g., a backbone node (e.g., a test action node), an application action node, and the like). In this example, the backbone is comprised of test steps performed during test executions of the AUT, but DAGs consistent with disclosed implementations may use any suitable categorization of the data points as the backbone. For example, the backbone may be comprised according to user actions, recorded AUT web pages, UI objects, and/or any other suitable categorization.

The backbone of DAG 500 is correlated based on a sequence of events that occurred during the particular test execution, and thus the backbone links various ones of test steps 510a, 520a, 530a, 540a, and 550a together. In the example shown in FIG. 5, test step 510a occurred before test step 520a, test step 520a occurred before test step 530a, test step 530a occurred before test step 540a, and test step 540a occurred before test step S550a. Each portion of the backbone (e.g., each test step) in this example is connected via directed edges (only directed edge 560a has been labelled for clarity) from the first test step 510a of the test steps to the last test step 550a of the test steps, and the directed edges have been tagged (only tag 570a has been labelled for clarity) to identify a type of relation between the vertices. For example, test step 510a is directly linked with test steps 520a, 530a, and 540a via the directed edges, and the cause and/or effect of the linkage is shown in the tagging. For example, test step 510a is composed of test steps 520a, 530a, and 540a, test step 520a precedes test step 530a, test step 530a precedes test step 540a, and test step 550a precedes test step 540a.

Furthermore, each test step in DAG 500 has additional information that was captured from the testing and/or application environment and was correlated with the particular test step. This additional information (e.g. metadata) has been assigned as vertices (only vertices 520b, 520c, 520d, 520e, and 520f have been labelled for clarity) connected to the backbone. For example, test step 520a relates to opening a browser. In this case, the step of opening the browser included using the browser (an object) and it was used with a specific action (in this case open). Thus, during this particular test execution state the browser was automatically opened by calling the open function of the browser. This information is modelled in DAG 500 not only by linking the test actions and what follows in terms of the AUT and its environment, but also by the tags that essentially indicate the conceptual meaning of those steps. Each test action and the linking of the actions that follow in response to the test action in terms of the AUT and its environment may be considered to be a node chain of the DAG. Thus, in some implementations, there may be a node chain for each test action performed during the test execution.

Figure 6:
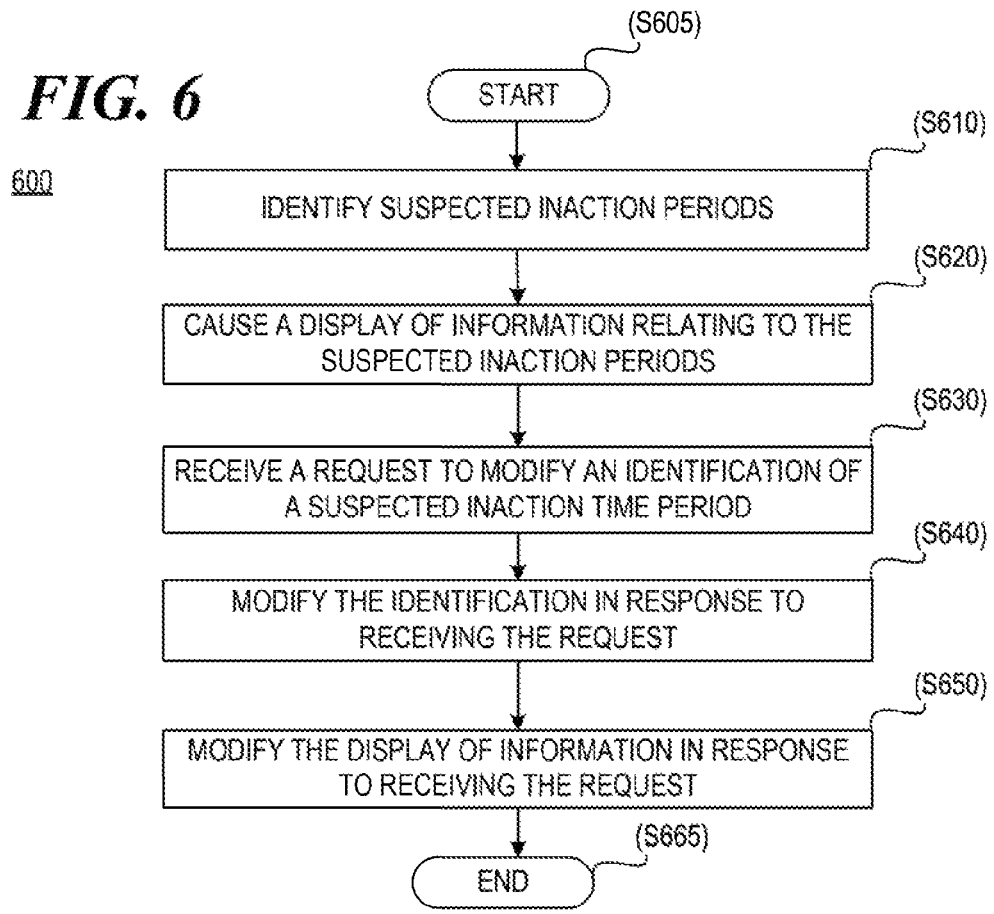
FIG. 6 is a flow chart of an example process for determining idle test periods consistent with disclosed implementations.

FIG. 6 is a flow chart of an example process 600 for determining idle test periods consistent with disclosed implementations. Although execution of process 600 is described below with reference to system 100 of FIG. 1 and/or specific components of system 100, other suitable systems and devices for execution of at least one step of process 600 may be used. For example, processes described below as being performed by idle testing period device 110 may be performed by idle testing period device 210, idle testing period device 310, idle testing period device 710, and/or any other suitable device. Process 600 may be implemented in the form of executable instructions stored on a machine-readable storage medium and/or in the form of electronic circuitry.

Process 600 may start (step S605) by analyzing data points, such as the data points stored in a DAG. In some implementations, the data points may be data points captured, correlated, and/or stored in a DAG as described above. For example, an idle testing period determination engine (such as engine 340) may determine idle testing periods of test executions by analyzing data points stored in a DAG. As another example, the data may be captured, correlated, and/or stored by a system external to system 100. Process 600 may include identifying suspected inaction periods (step S610). Suspected inaction periods may be periods of time that are suspected, based on an analysis of captured data (e.g., the data captured above by data capture engine 320), as being idle testing periods. Not all suspected inaction periods need be idle testing periods (although in some instances, they may be). For example, as described in further detail below, the identification of the suspected inaction periods may ultimately be modified such that they suspected inaction periods are reclassified as a false inaction periods. In some implementations, suspected inaction periods may be identified based on the correlation of the data points. For example, idle testing period device 110 may determine suspected inaction periods by identifying periods of time where there is an absence of at least one particular type of application action data (e.g., data classified as being an application action node) and at least one particular type of test action data (e.g., data classified as being a test action node). For example, idle testing period device 110 may analyze the data stored in a DAG described above to determine periods of time during a particular test where a tester was not interacting with the AUT even though the AUT was available for interaction. In some implementations, idle testing period device 110 may analyze the data by identifying preliminary inaction periods. For example, idle testing period device 110 may query a repository including a DAG to identify test action nodes and their associated node chains, identify application action nodes that are part of each test action node chain, and identify the timestamps associated with each node. Based on these identifications, idle testing period device 100 may calculate, for each node chain, the length of time between a test action node in a particular node chain and the last application action node in a chain that immediately preceded (e.g., preceded in time) the particular node chain. These two nodes (the test action node and the last application node that immediately preceded it are hereinafter referred to as "idle testing period node pairs". Thus, in this example, the length of time between the idle testing period node pairs may be considered to be a preliminary inaction period.

As another example, idle testing period device 110 may determine suspected inaction periods by comparing the preliminary inaction periods to a threshold range. The threshold range may be either a static range, a dynamic range, and/or a combination thereof. For example, the threshold range may be a predetermined range set by idle testing period device 110, such as between 0 and 10 seconds, between 5 second and 1 minute, and the like. As another example, the threshold range may be based on statistics related to the idle testing periods and dynamically calculated (e.g., calculated in real-time) by idle testing period device 110, such as the average of all the idle testing periods identified by idle testing period device 110. As yet another example, the threshold range may differ based on the type of test action being performed. In some implementations, each of the preliminary inaction periods that are within the threshold range may be identified by idle testing period device 110 as a suspected inaction period, while each of the preliminary inaction periods that are not within the threshold range may be identified as a false inaction period (e.g., as not a suspected inaction period).

Process 600 may also include causing a display of information relating to the suspected inaction periods. For example, idle testing period device 110 may generate and/or otherwise make code available for use by client device 120 in a manner that causes client device 120 to display the information. For example, display 126 of client device 120 may display information related to the suspected inaction periods. The information may include a list of the idle testing period node pairs, their associated idle testing periods, and/or metrics related to the idle testing periods, such as average overall idle testing periods, average idle testing periods for particular tests associated with the idle testing period node pairs, information related to other nodes that are part of the chains of the idle testing period node pairs (e.g., a graphical display of the node chains), and/or any other suitable information.

Process 600 may also include receiving a request to modify an identification of at least one of the suspected inaction periods to a false inaction period. For example, in some implementations, and as described above, information related to the suspected inaction periods may be displayed on a display device. A user may view this information and may identify idle testing period node pairs that the user wants to exclude from being classified as resulting in an idle testing period. For example, there may be an extremely long suspected inaction period that may be associated with a tester simply stepping away momentarily from the test, and the user may want to exclude that particular suspected inaction from metric calculations associated with the idle testing periods. In this case, a user may input modification information to a user interface displayed on display device 126 that indicates that the suspected inaction period associated with particular idle testing node pair was actually a false inaction period, and the request may be received by idle testing period device 110.

In response to receiving the request, process 600 may also include modifying the identification of the at least one of the suspected inaction periods to the false inaction period. For example, idle testing period device 110 may modify the identification and stored the modified identification in a storage device, such as repository 130. Additionally, process 600 may also include modifying the display of the information based on the request (step S650). For example, the idle testing node pairs associated with the modification information may be removed from a list of the suspected inaction periods, the average idle testing periods for particular tests and/or the average overall idle testing periods may be recalculated and redisplayed based on the removal, and the like. Once one or more of steps S610, S620, S630, S640, and S650 have been performed, process 600 may end (step S665).

Figure 7:
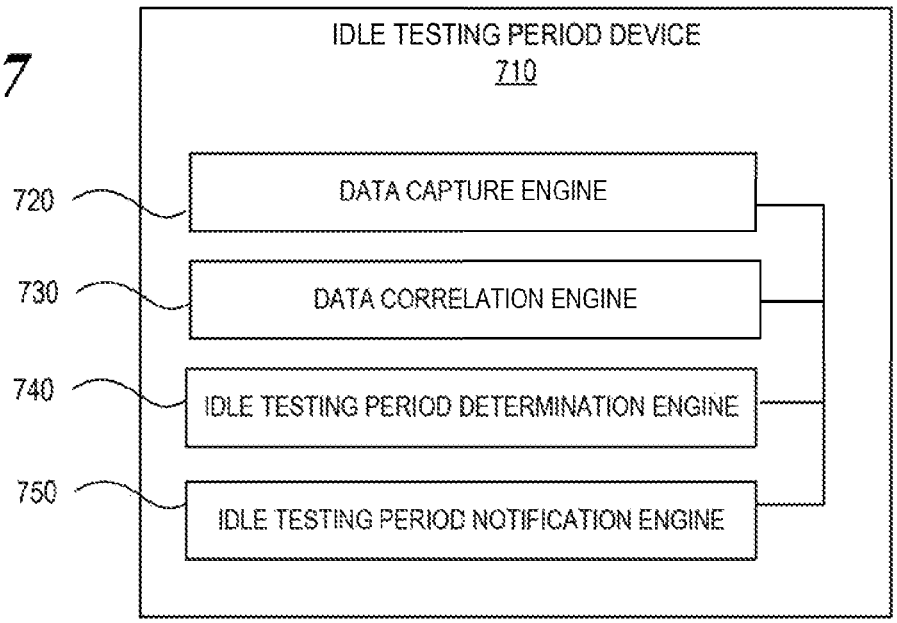
FIG. 7 is a block diagram of an example idle testing period device consistent with disclosed implementations.

FIG. 7 is a block diagram of an example idle testing period device 710 consistent with disclosed implementations. In certain aspects, idle testing period device 710 may correspond to idle testing period device 110 of FIG. 1, idle testing period device 210 of FIG. 2, and/or idle testing period device 310 of FIG. 3. Device 710 may be implemented in various ways. For example, device 710 may be a special purpose computer, a server, a mainframe computer, and/or any other suitable type of computing system. In the example shown in FIG. 7, device 710 may include a data capture engine 720, a data correlation engine 730, an idle testing period determination engine 740, and an idle testing period notification engine 750.

Engines 720, 730, 740, and 750 may be electronic circuitry for implementing functionality consistent with disclosed examples. For example, engines 720, 730, 740, and 750 may represent combinations of hardware devices and programming to implement the functionality consistent with disclosed implementations. In the example shown in FIG. 7, the functionality of engines 720, 730, and 740 may correspond to the functionality of engines 320, 330, and 340 of FIG. 3.

In some implementations, idle testing period notification engine 750 may represent a combination of hardware and programming that may function to monitor a current test execution of the AUT and, based on the determined idle testing periods, may function to cause a display of a notification based on the monitoring. For example, the hardware may be a processor (e.g., processor 220 of FIG. 2) and the programming may be processor-executable instructions stored on a non-transitory machine-readable storage medium (e.g., machine-readable storage medium 230 of FIG. 2). In some implementations, the display of the notification may be caused in response to a particular test action performed during the current test execution. For example, the test executions of the AUT may be considered to be historical test executions, and the idle testing periods may be considered to be historical idle testing periods. Upon execution of a current test, such as a manual test, the idle testing period notification engine 750 may monitor the current test execution, and data regarding the current test execution may be captured by data capture engine 720 and/or correlated by data correlation engine 730 using at least one of the processes discussed above. While the data is being captured, idle testing period notification engine 750 may match data from the historical test executions with the data being captured during the current test execution. For example, the idle testing period notification engine 750 may match the current test executions with historical test executions of the same test based on data related to a test identifier. For example, the captured and correlated data may include metadata identifying the test (e.g., the test identifier) that is being executed. If the test identifier in the current test execution is the same as the test identifier in a historical test execution, the current test execution and the historical test execution may be considered to be a match.

In some implementations, the idle testing period notification engine 750 may determine whether or not the test action being performed corresponds to a historical test action performed in historical test executions (e.g., historical test executions of the same test), and whether the historical test action resulted in an idle testing period in a number (e.g., a predetermined number, such as 0, 1, 5, 10, and the like) of the historical test executions. If so, idle testing period notification engine 750 may cause a display of a notification. For example, idle testing period notification engine 750 may cause the generation of a message via a user interface displayed on display device 126. The message may indicate that a possible idle time is about to occur and should be reduced as much as possible. For example, the message may include information indicating that the tester should perform a test action as no wait time for additional AUT processing is needed.

In some implementations, idle testing period notification engine 750 may represent a combination of hardware and programming that may function to map automated test scripts to the correlated data and identify potential automated script idle testing periods based on the mapping and the historical idle testing periods discussed above. For example, as described above, automated test scripts may include built-in timeouts to account for AUT processing. In some implementations, idle testing period notification engine 750 may query a repository (such as repository 130) for a list of the historical idle testing periods of historical executions of the automated test script and, based on the results of the query, may cause the provision of an indication that certain built-in timeouts in the automated script generate idle testing periods. For example, idle testing period notification engine 750 may cause the display of the indication on a display device, such as display device 126 of client device 120. The indication may be any suitable format such as, for example, text and/or graphics identifying the built-in timeouts in the script that resulted in the idle testing periods and/or information related to the idle testing periods themselves. For example, take the case where the built-in timeout between the current test action and the next test action was two minutes. However, the actual AUT processing time in response to the same test action took twenty seconds in a first historical test execution of the AUT (resulting in a one minute and forty second idle testing period) and thirty seconds in a second historical test execution of the AUT (resulting in a one minute and thirty second idle testing period). Idle testing period notification engine 750 may provide text identifying the built-in timeout, that there were two historical test executions that included idle testing periods for the same test action, the actual AUT processing times were twenty and thirty seconds, and that the idle testing periods were one minute and forty seconds and one minute and thirty seconds. In some implementations, an automation engineer may be able to use the provided information to identify automated test script steps which are ineffective due to overlong scripted delays. In this particular example, in order to reduce unnecessary testing time, the automation engineer may modify the test script to have a built-in time out of 30 or 40 seconds instead of the full two minutes that was previously in the script.

Figure 8:
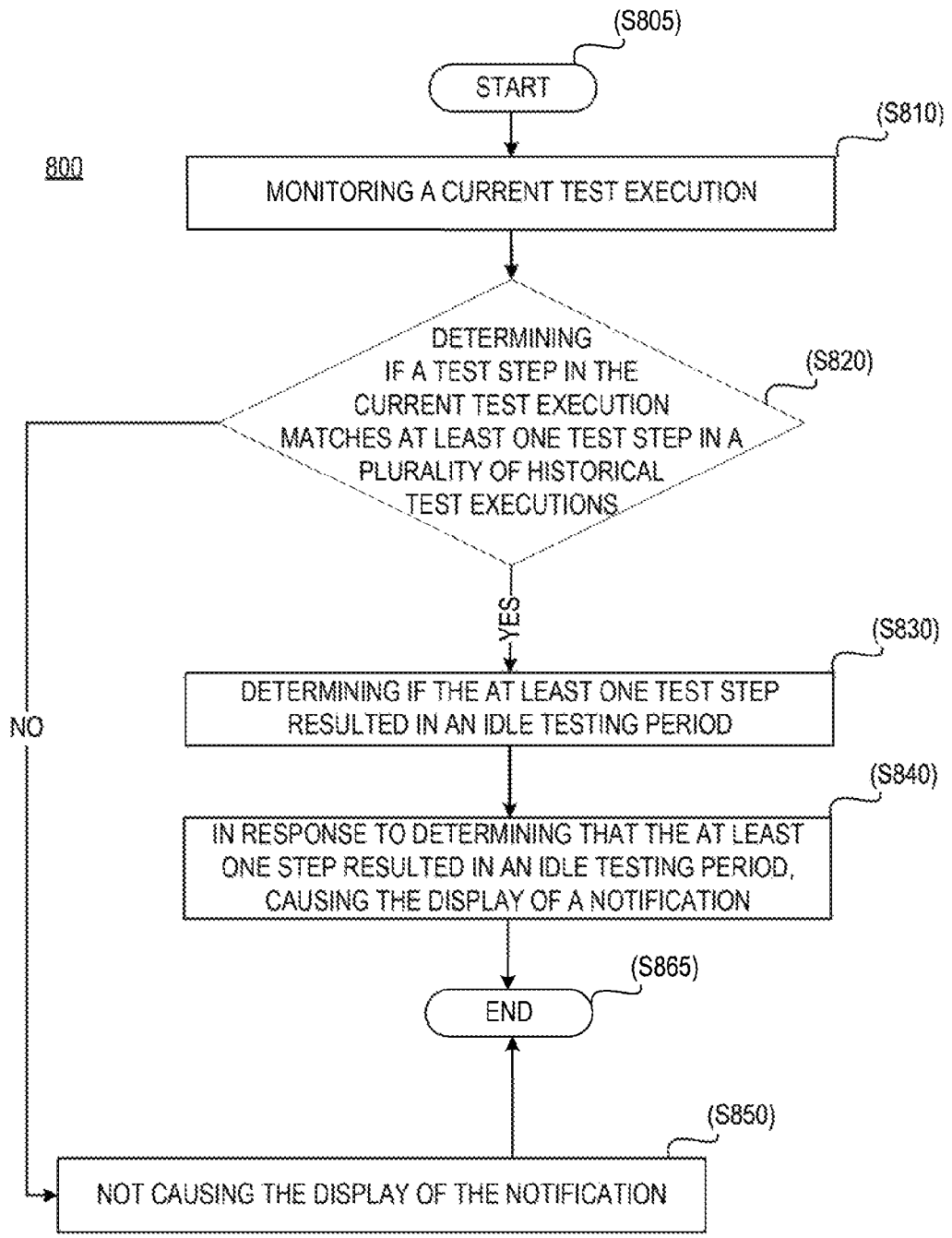
FIG. 8 is a flow chart of an example process for determining idle testing periods consistent with disclosed implementations.

FIG. 8 is a flow chart of an example process 800 for determining idle testing periods consistent with disclosed implementations. Although execution of process 800 is described below with reference to system 100 of FIG. 1 and/or specific components of system 100, other suitable systems and devices for execution of at least one step of process 800 may be used. For example, processes described below as being performed by idle testing period device 110 may be performed by idle testing period device 210, idle testing period device 310, idle testing period device 710, and/or any other suitable device. Process 800 may be implemented in the form of executable instructions stored on a machine-readable storage medium and/or in the form of electronic circuitry.

Process 800 may start (step S805) after a current test execution of an AUT has begun, and may include monitoring the current test execution of the AUT (step S810). For example, the current test execution may be monitored using an idle testing period notification engine, such as idle testing period notification engine 750 described above. Process 800 may also include determining if a test step in the current test execution matches at least one test step in a plurality of historical test executions (step S820). For example, the determination may be performed using an idle testing period notification engine, and may be based on the monitoring. In some implementations, the determination may be based on the monitoring using the methods described above with respect to, for example, FIG. 7. For example, the idle testing period notification engine may determine if the at least one test step resulted in the idle testing period by obtaining data from a DAG. In some examples, the DAG may correlate data points captured during the plurality of historical test executions with a particular test execution of the historical test executions, and each of the data points may be correlated based on a sequence of events the occurred during the particular historical test execution. In some examples, the DAG may include a backbone comprising test steps of a first test execution of the historical test executions, and each test step of the backbone may be connected via directed edges with data points captured during the first test execution. Additionally, in some examples, each test step of the backbone being connected based on a sequence of events associated with the data points. Furthermore, in some examples, the DAG may include vertices connected to the backbone, where the vertices are modeled by metadata associated with the first test execution, and tags associated with the directed edges, the tags identifying a type of relation between the vertices.

If the test step in the current test execution matches the at least one step in a plurality of historical test executions, process 800 may include determining if the at least one step resulted in an idle testing period in a number (any number greater than or equal to one) of the plurality of historical test executions (step S830). For example, the determination may be performed using an idle testing period notification engine, and the idle testing period may be an amount of time that elapses between a full update to a user interface of the AUT and a subsequent test action that immediately follows the full update. In some implementations, the full update to the user interface of the AUT may signal that the application has completed processing in a manner that would allow a tester to interact with the application and continue the current test execution. Process 800 may also include, in response to determining that the at least one test step resulted in the idle testing period, causing, using a display of a notification. For example, the display of the notification may be caused using the idle testing period notification engine, and the display of the notification and the notification itself may be the same as or similar to the notification described above with respect to FIG. 7.

If the test step in the current test execution does not match the at least one step in the plurality of historical test executions, process 800 may also include not causing the display of the notification (step S850). For example, an idle testing period notification may determine that there is no data regarding idle testing periods performed for this particular user action and/or this particular test, and may determine that no notification needs to be displayed. Once at least one of processes S810, S820, S830, S840, and S850 have been performed, process 800 may end (step S865).

Figure 9:
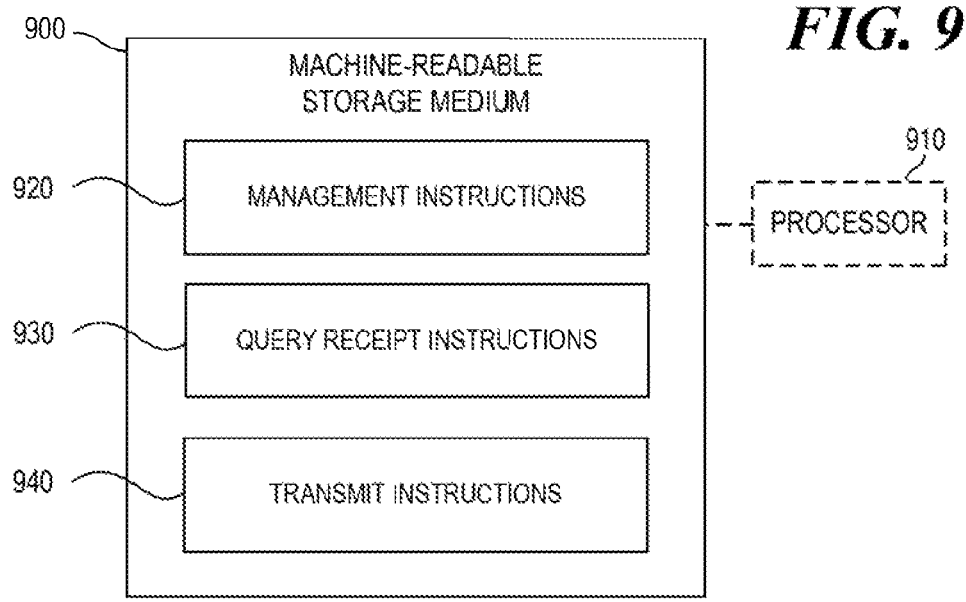
FIG. 9 is a block diagram of an example machine-readable storage medium consistent with disclosed implementations.

FIG. 9 is a block diagram of an example machine-readable storage medium 900 consistent with disclosed implementations. In certain aspects, machine-readable storage medium 900 may correspond with storage devices associated with system 100, idle testing period device 210, idle testing period device 310, idle testing period device 710, and/or any other suitable storage device. Machine-readable storage medium 900 may be any electronic, magnetic, optical, or other physical storage device that stores executable instructions. Thus, machine-readable storage medium 900 may be, for example, memory, a storage drive, an optical disc, and the like. In some implementations, machine-readable storage medium 900 may be a non-transitory machine-readable storage medium, where the term "non-transitory" does not encompass transitory propagating signals. Machine-readable storage medium 900 may be encoded with instructions that, when executed by a processor 910 (e.g., a processor that is the same or similar to processor 210 of FIG. 2 and described above), perform operations consistent with disclosed implementations. For example, machine-readable storage medium 900 may include instructions that perform operations to manage a data structure (e.g., a DAG) stored on a storage device, such as the storage of the data structure in step S460 of FIG. 4. In the example shown in FIG. 9, machine-readable storage medium 900 may include management instructions 920, query receipt instructions 930, and transmit instructions 940.

Management instructions 920 may function to manage a data structure (e.g., a DAG) stored on a storage device (e.g.

repository 130 of FIG. 1). For example, when management instructions 920 are executed by processor 910, management instructions 920 may cause processor 910 to manage a data structure including a backbone comprising test steps of a historical test execution of an AUT. In some examples, each test step of the backbone may be connected via directed edges with data points captured during the test execution. Furthermore, each test step of the backbone may be connected based on a sequence of events associated with the data points. In some examples, the data structure may also include vertices connected to the backbone, where the vertices are modeled by metadata associated with the test execution. Furthermore, in some examples, the data structure may include tags associated with the directed edges that identify a type of relation between the vertices. Furthermore, in some examples, the data structure may include idle testing periods associated with the historical test execution. In some examples, the data structure may be a DAG as described above.

The management of the data structure may be implemented in various ways. In some examples, system 100 may create the data structure each time a test of an AUT is executed. In some examples, system 100 may create and/or update the data structure in a bulk operation by creating a temporary data structure to store the correlations between data points and/or the idle testing periods. The temporary data structure may be the same as, similar to, or different from the data structure. Additionally, system 100 may update data structure based on additional test executions of the AUT. For example, system 100 may update the data structure to include additional DAGs generated based on additional test executions (e.g., based on a second test execution) of the AUT (and/or a different AUT) and/or their associated idle testing periods. These additional test executions may have been performed after the creation of the original data structure.

Query receipt instructions 930 may function to receive a query to access the data structure. For example, when query receipt instructions 930 are executed by processor 910, query receipt instructions 930 may cause processor 910 to receive a query to access the data structure. The query may include first information to identify a potential idle testing period associated with a current test step that matches at least one of the test steps in the historical test execution. For example, the match may be performed using processes described above. In some examples, the first information may be test identification information, test action identification information, and/or any other information suitable to identify the particular test action that is being performed in a current test.

Transmit instructions 940 may function to transmit information that is responsive to the query. For example, when transmit instructions 940 are executed by processor 910, transmit instructions 940 may cause processor 910 to transmit second information from the data structure that is responsive to the query. For example, the second information may be information related to idle testing periods associated with the historical test executions that match the particular test action that is being performed in the current test.

The disclosed examples may include systems, devices, machine-readable storage media, and methods for determining idle testing periods. For purposes of explanation, certain examples are described with reference to the components illustrated in FIGS. 1-3, 7, and 9. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-9 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-9. Thus, the present disclosure merely sets forth possible examples of implementations, and many variations and modifications may be made to the described examples. All such modifications and variations are intended to be included within the scope of this disclosure and protected by the following claims.

We claim:

1. A system comprising:
a processor; and
a non-transitory storage medium storing instructions executable on the processor to:
capture data points during first test executions of an application under test, the data points including test action data and application action data;
perform graph analysis to correlate each of the data points with a particular test execution of the first test executions by generating a directed acyclic graph in which the data points are stored, each of the data points being correlated based on a sequence of events that occurred during the particular test execution and the directed acyclic graph being generated based on timestamps associated with the data points; and
determine idle testing periods of the first test executions by analyzing the data points stored in the directed acyclic graph, wherein determining the idle testing periods comprises determining the idle testing periods based on the correlation of the data points, and the idle testing periods being periods of time where both the first test executions and the application under test are idle.

2. The system of claim 1, wherein:
the application action data includes data related to actions performed by the application under test in response to test actions performed during the first test executions, the application action data including data related to various levels of the application under test, the levels including at least one of a user interface level, a code level, a network communication level, a database level, or an environment level; and
the test action data includes data related to the test actions, the test action data including at least one of a start test step, an end test step, a report test result step, a complete test step, or a report test step.

3. The system of claim 1, wherein the instructions are to generate the directed acyclic graph by:

categorizing each of the data points into at least one of a plurality of types, the at least one of a plurality of types including a first type;

assigning data points categorized as the first type as a backbone of a data structure;

connecting remaining data points to the backbone via directed edges based on timestamps associated with the remaining data points, the remaining data points being a set of the data points not categorized as the first type;

assigning metadata as vertices connected to the backbone; and assigning tags to the directed edges to identify a type of relation between the vertices.

4. The system of claim 1, wherein the instructions are to determine the idle testing periods by identifying, based on the correlation of the data points, suspected inaction periods during the first test executions where there is an absence of at least one particular type of application data and at least one particular type of test action data.

5. The system of claim 4, wherein the suspected inaction periods are identified by:

identifying preliminary inaction periods;

comparing the preliminary inaction periods to a threshold range;

identifying each of the preliminary inaction periods that are within the threshold range as a suspected inaction period of the suspected inaction periods; and identifying each of the preliminary inaction periods that are not within the threshold range as a false inaction period.

6. The system of claim 4, wherein the instructions are executable on the processor to:

cause a display of information relating to the suspected inaction periods; and receive a request to modify the identification of at least one of the suspected inaction periods to a false inaction period.

7. The system of claim 6, wherein, in response to receiving the request, the instructions are executable on the processor to:

modify the identification of the at least one of the suspected inaction periods to the false inaction period; and modify the display of the information based on the request.

8. The system of claim 1, wherein the instructions are executable on the processor to:

monitor a current test execution of the application under test and, based on the determined idle testing periods, cause a display of a notification based on the monitoring, wherein the first test executions of the application under test are historical test executions.

9. The system of claim 1, wherein the idle testing periods are historical idle testing periods, and the instructions are executable on the processor to:

map automated test script steps to the data points; and identify potential automated script idle testing periods based on the mapping and the historical idle testing periods.

10. The system of claim 1, wherein each of the idle testing periods is an amount of time that elapses between a full update to a user interface of the application under test and a subsequent test action that immediately follows the full update.

11. A method comprising:

capturing data points during first test executions of an application under test, the data points including test action data and application action data;

performing graph analysis to correlate each of the data points with a particular test execution of the first test executions by generating a directed acyclic graph in which the data points are stored, each of the data points being correlated based on a sequence of events that occurred during the particular test execution and the directed acyclic graph being generated based on timestamps associated with the data points; and determining idle testing periods of the first test executions by analyzing the data points stored in the directed acyclic graph, wherein determining the idle testing periods comprises determining the idle testing periods based on the correlation of the data points, and the idle testing periods being periods of time where both the first test executions and the application under test are idle.

12. The method of claim 11, wherein:

the application action data includes data related to actions performed by the application under test in response to test actions performed during the first test executions, the application action data including data related to various levels of the application under test, the levels including at least one of a user interface level, a code level, a network communication level, a database level, or an environment level; and the test action data includes data related to the test actions, the test action data including at least one of a start test step, an end test step, a report test result step, a complete test step, or a report test step.

13. The method of claim 11, wherein generating the directed acyclic graph comprises:

categorizing each of the data points into at least one of a plurality of types, the at least one of a plurality of types including a first type;

assigning data points categorized as the first type as a backbone of a data structure;

connecting remaining data points to the backbone via directed edges based on timestamps associated with the remaining data points, the remaining data points being a set of the data points not categorized as the first type;

assigning metadata as vertices connected to the backbone; and assigning tags to the directed edges to identify a type of relation between the vertices.

14. The method of claim 11, wherein determining the idle testing periods comprises identifying, based on the correlation of the data points, suspected inaction periods during the first test executions where there is an absence of at least one particular type of application data and at least one particular type of test action data.

15. The method of claim 14, wherein identifying the suspected inaction periods comprises:

identifying preliminary inaction periods;

comparing the preliminary inaction periods to a threshold range;

identifying each of the preliminary inaction periods that are within the threshold range as a suspected inaction period of the suspected inaction periods; and identifying each of the preliminary inaction periods that are not within the threshold range as a false inaction period.

16. The method of claim 14, further comprising:

causing a display of information relating to the suspected inaction periods; and receiving a request to modify the identification of at least one of the suspected inaction periods to a false inaction period.

17. The method of claim 16, further comprising, in response to receiving the request:
modifying the identification of the at least one of the suspected inaction periods to the false inaction period; and
modifying the display of the information based on the request.

18. The method of claim 11, further comprising:
monitoring a current test execution of the application under test and, based on the determined idle testing periods, causing a display of a notification based on the monitoring,
wherein the first test executions of the application under test are historical test executions.

19. The method of claim 11, wherein the idle testing periods are historical idle testing periods, the method further comprising:
mapping automated test script steps to the data points; and
identifying potential automated script idle testing periods based on the mapping and the historical idle testing periods.

20. The method of claim 11, wherein each of the idle testing periods is an amount of time that elapses between a full update to a user interface of the application under test and a subsequent test action that immediately follows the full update.

\* \* \* \* \*